April 29, 1941.   A. F. TEXTOR ET AL   2,240,103
MILK MIXING DEVICE
Filed April 2, 1940
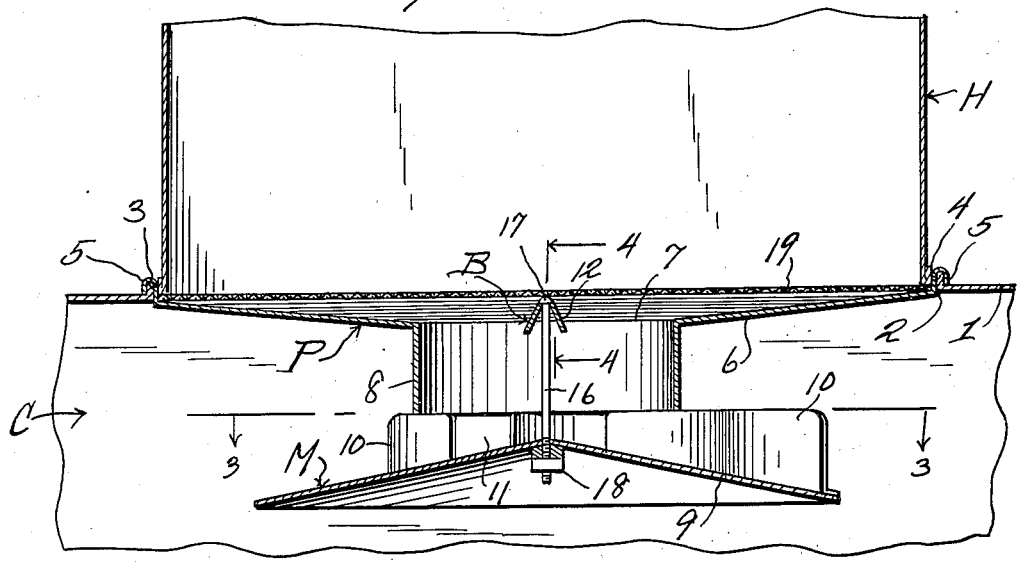
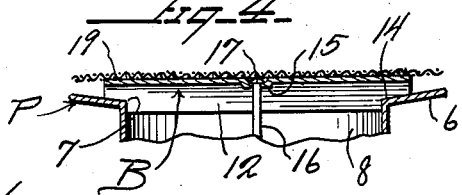
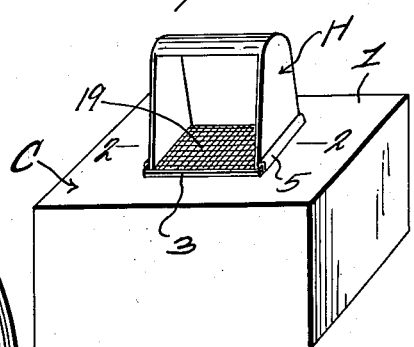
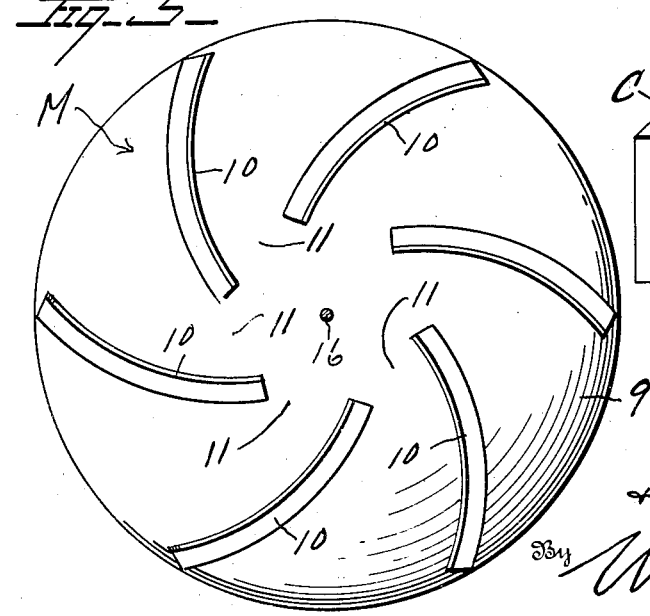
Inventors
A. F. Textor
R. F. Abbott
& H. E. Roberts
By Watson E. Coleman
Attorney Patented Apr. 29, 1941

2,240,103

UNITED STATES PATENT OFFICE 2,240,103

MILK MIXING DEVICE

Andre F. Textor and Raymond F. Abbott, Sussex, and Henry E. Roberts, New Brunswick, N. J.

Application April 2, 1940, Serial No. 327,500

4 Claims. (Cl. 259—180)

This invention relates to a milk mixing device, and it is primarily an object of the invention to provide a device of this kind for effecting a substantially uniform admixture of the ingredients of milk or the like as the same is poured into a conventional weighing can.

It is the general custom at creameries to purchase milk from the dairymen at so much per pound dependent upon the estimated butterfat content. The milk as received from a dairyman or farmer is poured into a weighing can which is placed upon a suitable scale. In connection with the cans now generally in use it is found that the milk received within the can often has the cream collected at one portion of the can so that when a withdrawal is made at the creamery for a butterfat test it frequently occurs that certain of the tests do not give a correct determination as at times the butterfat will be indicated as erroneously low and at other times erroneously high. It is an object of the invention to provide a device to be used in connection with the weighing can whereby the milk as received within the can will have its ingredients of a substantially uniform admixture thereby assuring a more accurate test.

The invention consists in the details of construction and in the combination and arrangement of the several parts of our improved milk mixing device whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:

Figure 1 is a view in perspective illustrating a conventional weighing can having applied thereto a mixing device constructed in accordance with an embodiment of our invention;

Figure 2 is an enlarged detailed fragmentary sectional view taken substantially on the line 2—2 of Figure 1;

Figure 3 is a sectional view taken substantially on the line 3—3 of Figure 2 looking in the direction of the arrows;

Figure 4 is a fragmentary detailed sectional view taken substantially on the line 4—4 of Figure 2.

As disclosed in the accompanying drawing, C denotes a conventional weighing can of desired dimensions and which is provided in its top wall 1 with a filling opening 2 of desired dimensions, the marginal portion of this opening 2 being defined by an upstanding flange 3. In the present embodiment of our invention, the opening 2 is substantially square although we do not wish to be understood as limiting ourselves to any particular form of opening.

Our improved mixing device as herein set forth comprises a shallow pan P which is snugly received within the opening 2 and which has certain of its side flanges 4 outwardly and downwardly returned, as at 5, so that said flanges 4 may be operatively engaged with adjacent flanges 3 to maintain the pan P in desired working position yet permitting the ready removal of the pan P when desired.

The bottom wall 6 of the pan P is tapered downwardly toward a central opening 7 which is defined by a relatively short depending sleeve or collar 8. This opening 7 is quite large and is preferably of a diameter equal to substantially one-third of the diameter of the bottom wall 6 of the pan P although this may be varied as the requirements of practice may deem advisable.

Underlying the sleeve or collar 8 is a mixing member M herein disclosed as comprising a plate 9 of a diameter considerably in excess of the diameter of the sleeve or collar 8. This plate 9 in the present embodiment of the invention is of a cone shape but of a small height. The high or central portion of this plate 9 is upwardly disposed and secured to the upper surface of the plate 9 and spaced circumferentially therearound are the upstanding arcuate blades 10. These blades 10, as herein disclosed, have their upper edges substantially coplanar and have their inner ends terminate short of the axial center of the plate 9 whereby entrance openings 11 are provided at the inner ends of the blades 10 as particularly illustrated in Figure 3. These blades 10 are to be positioned upon the plate 9 in a manner which assures the same having the most effective functioning.

Disposed across the opening 7 substantially radial thereof is a bar B herein disclosed as V-shaped in cross section with its apex disposed in a direction opposite to the sleeve or collar 8 when the bar B is in applied position. The side wings 12 of the bar B at the extremities thereof are provided in the free corner portions thereof with the notches or recesses 14 as particularly illustrated in Figure 4, whereby the bar B when applied extends partially through the opening 7 thus assuring said bar B being placed in effective working position. The central portion of the bar B at its apex is provided with an opening 15 through which is freely directed an elongated headed shank or bolt 16. In the present embodiment of the invention the head 17 of the shank or bolt contacts with the bar B. This shank or bolt 16 is of a length to extend through the sleeve or collar 8 and through the apex or high portion of the plate 9 and extends therebelow. Engaged with the portion of the shank or bolt 16 below the plate 9 are the holding or clamping nuts 18. It is believed to be obvious that this shank or bolt 16 provides means whereby the pan P and the plate 9 are effectively maintained in assembled relation with the lower or outer end of the sleeve or collar 8 in close contact with the outer longitudinal edges of the blades 10. It is also believed to be equally obvious that upon releasing the bolt or shank 16 the various parts can be readily disassembled and separated to facilitate cleaning so that the device can be maintained in a sanitary condition. It is also to be noted that the diameter of the plate 9 is such as to allow the same to be readily passed through the opening 7 so that such plate offers no hindrance or obstruction to the application or removal of the device.

After the pan P with its assembled parts has been placed in desired working position as illustrated in Figure 2, a splash hood H is snugly fitted within the pan P. This applied hood also serves to hold in proper position over the bottom wall 6 of the pan P a filtering fabric or screen 19. As illustrated in Figure 2, this screen 19 is not connected with either the pan P or the hood H so that its desired cleansing may be facilitated. It is to be stated, however, that if preferred this screen may be fixed to the lower portion of the hood H.

From the foregoing description it is thought to be obvious that a milk mixing device constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. A device for effecting a substantially uniform admixture of the ingredients of milk or the like upon being delivered within a container through a filling opening, said device comprising a pan to be supported over the filling opening, said pan having a substantially central discharge opening substantially defined by a depending collar, a mixing plate below the collar, said mixing plate being of a diameter greater than the diameter of the collar, upstanding blades carried by the plate spaced circumferentially therearound, and means for holding the plate in position below the collar with the upper margins of the blades in contact with the lower end of the wall of the collar.

2. A device for effecting a substantially uniform admixture of the ingredients of milk or the like upon being delivered within a container through a filling opening, said device comprising a pan to be supported over the filling opening, said pan having a substantially central discharge opening substantially defined by a depending collar, a mixing plate below the collar, said mixing plate being of a diameter greater than the diameter of the collar, upstanding blades carried by the plate spaced circumferentially therearound, and means for holding the plate in position below the collar with the upper margins of the blades in contact with the lower end of the wall of the collar, said plate and blades being fixedly connected but free of direct connection with the collar, the means for holding the plate in position with the edges of the blades in contact with the wall of the collar being releaseable.

3. A device for effecting a substantially uniform admixture of the ingredients of milk or the like upon being delivered within a container through a filling opening, said device comprising a pan to be supported over the filling opening, said pan having a substantially central discharge opening substantially defined by a depending collar, a mixing plate below the collar, said mixing plate being of a diameter greater than the diameter of the collar, upstanding blades carried by the plate spaced circumferentially therearound, a bar carried by the pan and disposed substantially radially across the discharge opening of the pan, an elongated shank depending from the bar and extending axially through the collar, and means for securing said shank to the central portion of the mixing plate to hold the mixing plate in applied position with the upper edges of the blades in contact with the lower edge of the wall of the collar.

4. A device for effecting a substantially uniform admixture of the ingredients of milk or the like upon being delivered within a container through a filling opening, said device comprising a pan to be supported over the filling opening, said pan having a substantially central discharge opening substantially defined by a depending collar, a mixing plate below the collar, said mixing plate being of a diameter greater than the diameter of the collar, upstanding blades carried by the plate spaced circumferentially therearound, a bar carried by the pan and disposed substantially radially across the discharge opening of the pan, an elongated shank depending from the bar and extending axially through the collar, and means for securing said shank to the central portion of the mixing plate to hold the mixing plate in applied position with the upper edges of the blades in contact with the lower edge of the wall of the collar, said bar being V-shaped in cross section with its apex upwardly disposed.

ANDRE F. TEXTOR.
RAYMOND F. ABBOTT.
HENRY E. ROBERTS.